J. L. BARNES.
TIRE PROTECTOR.
APPLICATION FILED DEC. 16, 1908.
1,016,812.
Patented Feb. 6, 1912.
2 SHEETS—SHEET 1.
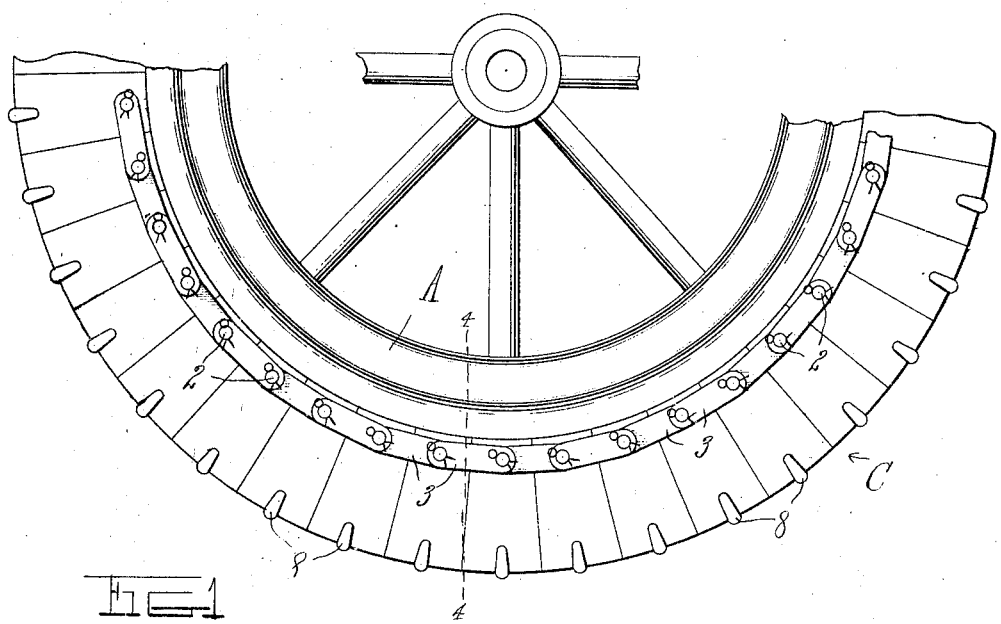
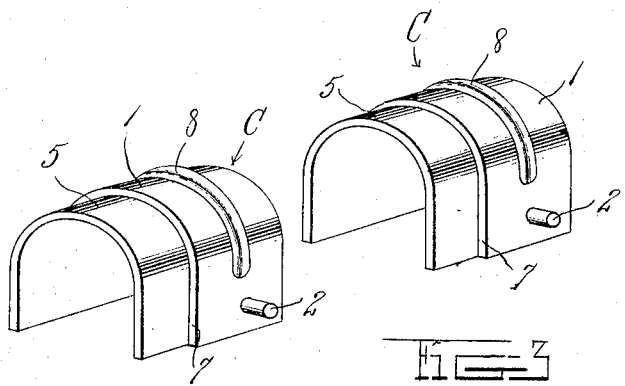
Witnesses
J. H. Crawford
M. T. Miller
Inventor
Joseph L. Barnes,
By Chandler & Chandler
Attorneys

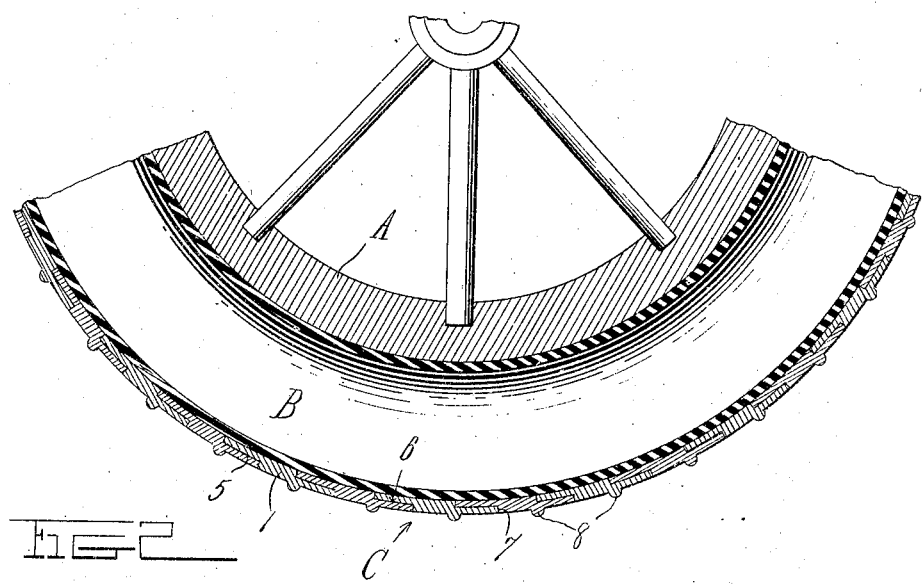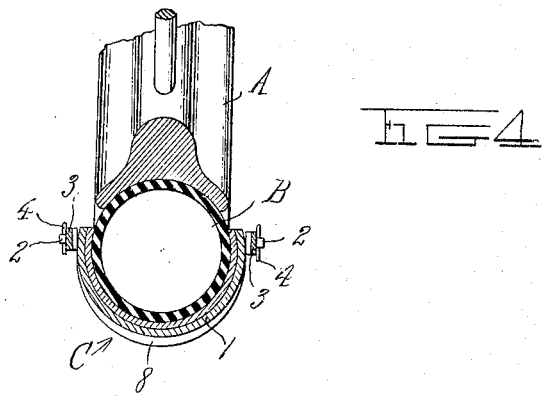

UNITED STATES PATENT OFFICE.

JOSEPH L. BARNES, OF DES MOINES, IOWA.

TIRE-PROTECTOR.

1,016,812.  Specification of Letters Patent.  Patented Feb. 6, 1912.

Application filed December 16, 1908. Serial No. 467,873.

*To all whom it may concern:*

Be it known that I, JOSEPH L. BARNES, a citizen of the United States, residing at Des Moines, in the county of Polk, State of Iowa, have invented certain new and useful Improvements in Tire-Protectors; and I do hereby declare the following to be a full, clear, and exact description of the invention, such as will enable others skilled in the art to which it appertains to make and use the same.

This invention relates to tire protectors, and has for its principal object to provide an efficient, simple and secure cover for tires and more especially for pneumatic tires, such as are used on motor vehicles, for the purpose of protecting the tires from puncture and preventing them from skidding on slippery roads.

The protector or housing is designed to cover the entire exposed portion of the tire and is formed of a series of overlapping metal plates, so arranged that there will be two thicknesses of metal between the tire and the road. The plates which form the protector are flexibly connected near the rim of the wheel by means of links pivoted to the plates near their ends, the pivotal points being so disposed on the plates that the tread portions thereof are adapted to move or slide over each other, to allow for the compression of the tire when supporting the weight of the vehicle. The links are removably connected to the plates, so that in case of injury, any plate may be quickly removed and a new one substituted.

Another object of the invention is to provide a plate which is provided with a transverse rib projecting from its exterior face directly opposite the step in the interior face whereby said rib constitutes both tractor and reinforcing means.

With these and other objects in view, the invention consists of the novel construction, combination and arrangement of parts hereinafter described and claimed, and illustrated in the accompanying drawing, in which—

Figure 1 is a side elevation of a portion of an automobile wheel provided with the improved protector or housing; Fig. 2, a similar view of the wheel with the protector or housing in section; Fig. 3, a perspective view of two of the plates separated, and, Fig. 4 is a cross sectional view on the line 4—4 of Fig. 1.

Similar reference characters indicate the same parts in all of the figures.

In the drawing, A indicates a portion of a motor vehicle wheel rim, and B a pneumatic tire surrounding the same. Covering the tire throughout its circumference, is a protector C formed of a series of plates 1, semi-circular in cross section each of which extends around the exposed surface of the tire, their ends terminating close to the rim of the wheel, on each side of which ends project pins 2 connected or flexibly joined by links 3, and retained thereon by any suitable means, such as cotter pins 4. When it is desired to remove a plate, the cotter pins are withdrawn from the pins, such links as are necessary removed and the plate slid outwardly from beneath the one overlapping.

Each plate 1 is formed of metal bent, rolled, cast or otherwise formed into a semicircle, one side of which from end to end is depressed as at 5 on its outer face, while the other side 6 has a similar depression on its inner face. These depressions extend the full width of the plate and occupy about one-half the thickness thereof. From this, it will be seen that when the plates are assembled, they present practically a smooth exterior surface broken only at the edges of the plates, but this interruption of their smooth surface is so slight as not to interfere with the smooth even running of the wheel nor is it great enough to separate the plates and expose the tire. The outwardly projecting pins 2 on the plates 1 near the ends thereof may be integral therewith or attached thereto on the outer face of that half of the plate which is provided with the depression 6 on its inner side, so that when the plates are joined by the flexible connecting links 3, they will move or slide on each other with these pins as an axis, thus preventing separation to any great extent of the plates at the shoulders 7 which form the inner terminal of the outer depressions 5 and the edge of said plates which lie adjacent thereto. The outer exposed faces of such plates, are provided with a rib 8 which extends transversely of said plates on its tread surface, the object of these ribs being to prevent skidding or slipping of the wheels and also to increase the tractive power thereof when passing over soft or slippery roads. Each of these ribs 8 are disposed directly opposite the step in the interior face to form a combined tractor and reinforcing means.

In a tire protector or housing such as above described, a secure protection is provided for pneumatic tires which will prevent their being injured in any way, either from unintentional puncture or cutting on the road or malicious injury when not running. It will be seen that the tire is wholly covered by the metal plates of the protector, and as these plates overlap for nearly one-half their width, it will be impossible for any person to insert an implement between the plates which would reach the tire, or to puncture the plates with a sharp instrument.

It is to be understood that the curvature of the plates 1 is such that they will fit snugly against the tire when the latter is inflated, thus preventing the weight of the vehicle from bending or distorting said plates. It will further be noted that by joining the plates by means of the flexible connection on each side of the protector near the rim of the wheel, no other means is required to fasten the protector to the wheel rim.

What is claimed is:—

A tire protector comprising a plurality of like overlapping flexibly connected U-shaped plates, each plate having its exterior face stepped at one end and its interior face stepped at its other end throughout its entire width so that said plates will lie in telescopic relation with their inner and outer faces in registration, the abutting edges of all of said plates converging toward a common center so that the strain upon the sustaining plate will be transmitted to the remaining plates and reinforce the former, a pin projecting outwardly from each plate at a point between its ends, links pivotally mounted on said pin and connecting said plates to one another, the ends of each link being disposed in overlapping relation to the ends of the adjacent links, each of said U-shaped plates being further provided with a transverse rib projecting from its exterior face directly opposite the step in the interior face whereby said rib constitutes both tractor and reinforcing means.

In testimony whereof, I affix my signature in presence of two witnesses.

JOSEPH L. BARNES.

Witnesses:
W. M. BARNES,
JOSHUA JESTER.